(12) United States Patent
Chen et al.

(10) Patent No.: US 11,541,691 B2
(45) Date of Patent: Jan. 3, 2023

(54) COMPOSITE TREAD WITH TARGETED STIFFNESS GRADIENT AND METHOD OF MAKING

(71) Applicant: The Goodyear Tire & Rubber Company, Akron, OH (US)

(72) Inventors: Hongbing Chen, Broadview Heights, OH (US); Christopher David Dyrlund, Canton, OH (US); Adam Mark Baldan, Akron, OH (US); Elizabeth Amelia Rogenski, Atwater, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 71 days.

(21) Appl. No.: 16/595,928

(22) Filed: Oct. 8, 2019

(65) Prior Publication Data
US 2020/0198274 A1   Jun. 25, 2020

Related U.S. Application Data

(60) Provisional application No. 62/781,807, filed on Dec. 19, 2018.

(51) Int. Cl.
*B60C 11/00* (2006.01)
*B29D 30/06* (2006.01)
(Continued)

(52) U.S. Cl.
CPC ...... *B60C 11/0041* (2013.01); *B29D 30/0681* (2013.01); *B29D 30/1621* (2013.01);
(Continued)

(58) Field of Classification Search
CPC . B60C 11/00; B60C 11/0008; B60C 11/0041; B60C 11/0066; B60C 2011/0091; B29D 30/1621; B29D 30/1628
(Continued)

(56) References Cited

U.S. PATENT DOCUMENTS

| 5,937,926 A | 8/1999 | Powell |
| 6,318,432 B1 | 11/2001 | Caretta et al. |

(Continued)

FOREIGN PATENT DOCUMENTS

| CN | 107141530 A | 9/2017 |
| CN | 107960133 A | 4/2018 |

(Continued)

OTHER PUBLICATIONS

Naohiro Tawara, JP-2005008072-A, machine translation. (Year: 2005).*

(Continued)

*Primary Examiner* — Robert C Dye
*Assistant Examiner* — Sedef E Paquette
(74) *Attorney, Agent, or Firm* — Katherine A. Smith; June E. Rickey

(57) ABSTRACT

A method for forming a composite tread, the method comprising the steps of: forming a coextruded strip of a first compound and a second compound, wherein the first compound is a tread compound, and the second compound is formed from a second compound, wherein the tread is formed from winding the coextruded strip onto the tire building drum while varying the ratio of the first compound to the second compound

7 Claims, 6 Drawing Sheets

(51) Int. Cl.
*B29D 30/16* (2006.01)
*B29D 30/00* (2006.01)

(52) U.S. Cl.
CPC .. *B60C 11/0066* (2013.01); *B29D 2030/0033* (2013.01); *B60C 2011/0091* (2013.01)

(58) Field of Classification Search
USPC .......................... 152/209.1, 209.5; 156/117
See application file for complete search history.

(56) References Cited

U.S. PATENT DOCUMENTS

| | | | |
|---|---|---|---|
| 8,925,606 | B2 | 1/2015 | Bordoz et al. |
| 9,487,050 | B2 | 11/2016 | Sandstrom et al. |
| 9,833,956 | B2 | 12/2017 | Neavin et al. |
| 10,427,463 | B2 | 10/2019 | Schweitzer et al. |
| 2007/0017615 | A1* | 1/2007 | Nobuchika ............ B29D 30/60 152/152.1 |
| 2007/0175557 | A1 | 8/2007 | Puhala et al. |
| 2007/0295433 | A1 | 12/2007 | Losi et al. |
| 2008/0006356 | A1 | 1/2008 | Takahashi et al. |
| 2009/0107597 | A1 | 4/2009 | Loewenhaupt et al. |
| 2009/0314401 | A1* | 12/2009 | Hitotsuyanagi .... B29D 30/3028 156/117 |
| 2009/0320985 | A1 | 12/2009 | Kudo et al. |
| 2011/0146885 | A1 | 6/2011 | D'Sidocky et al. |
| 2011/0146888 | A1 | 6/2011 | D'Sidocky et al. |
| 2012/0263906 | A1 | 10/2012 | Ausen et al. |
| 2013/0075017 | A1 | 3/2013 | Kaes et al. |
| 2015/0090381 | A1 | 4/2015 | Shimomura |
| 2015/0328931 | A1 | 11/2015 | Guerinon et al. |
| 2017/0001399 | A1 | 1/2017 | Dyrlund et al. |
| 2018/0093406 | A1 | 4/2018 | De Bruijn et al. |
| 2018/0117972 | A1 | 5/2018 | Perrin et al. |
| 2018/0326790 | A1 | 11/2018 | Joulin et al. |

FOREIGN PATENT DOCUMENTS

| | | | |
|---|---|---|---|
| CN | 108472851 | A | 8/2018 |
| DE | 102007004493 | A1 | 7/2008 |
| DE | 10201422316 | | 5/2016 |
| EP | 0853010 | A1 | 7/1998 |
| EP | 2338662 | A1 | 6/2011 |
| EP | 2468476 | A1 | 6/2012 |
| EP | 3235623 | A1 | 10/2017 |
| EP | 3208110 | B1 | 8/2018 |
| EP | 3037241 | B1 | 7/2020 |
| JP | 09071112 | | 3/1997 |
| JP | 2001191766 | A | 7/2001 |
| JP | 2003326614 | A | 11/2003 |
| JP | 2005008072 | A | 1/2005 |
| JP | 2005008072 | A * | 1/2005 |
| JP | 2006168564 | A * | 6/2006 |
| JP | 2006168564 | A | 6/2006 |
| JP | 4070504 | B2 | 1/2008 |
| JP | 2008024222 | A * | 2/2008 |
| JP | 2008024222 | A | 2/2008 |
| JP | 2012131280 | A | 7/2012 |
| JP | 2015013519 | A | 1/2015 |
| KR | 20130103874 | A | 9/2013 |
| WO | 2016199037 | A1 | 12/2016 |
| WO | 2018002487 | A1 | 1/2018 |
| WO | 2018043058 | A1 | 3/2018 |

OTHER PUBLICATIONS

Hiroyuki Nonaka, JP-2006168564-A, machine translation. (Year: 2006).*
Shoichiro Matsuda, JP-2008024222-A, machine translation. (Year: 2008).*
Matsuda S, JP-2008024222-A, machine translation. (Year: 2008).*
European Search Report for Serial No. EP19217293 dated May 26, 2020.
European Search Report for Serial No. EP19217299 dated Apr. 23, 2020.
European Search Report for Serial No. EP19217302 dated May 27, 2020.
Chinese Search Report for Serial No. 201911319937.4 dated Jun. 23, 2021.
Chinese Search Report for Serial No. 201911317858.X dated Jul. 8, 2021.
Chinese Search Report for Serial No. 201911319946.3 dated Jun. 28, 2021.
Bai Chunhua, Preparation, Modification and Wastewater Treatment Technology of Non-Metallic Mineral-Based Titanium Dioxide, Dec. 31, 2015, pp. 29-31, 1st edition, China University of Mining and Technology Press, Xuzhou, CN.
Rubber Wear, May 31, 1980, pp. 75-77, 1st edition, Chemical Industry Press.
Translation of Search Report for Chinese Serial No. 201911319946.3 dated Jan. 6, 2022.

* cited by examiner

COMPOSITE TREAD WITH TARGETED STIFFNESS GRADIENT AND METHOD OF MAKING

FIELD OF THE INVENTION

The invention relates in general to tire manufacturing, and more particularly to a method for forming a composite tread and tire with a targeted stiffness gradient.

BACKGROUND OF THE INVENTION

Tire manufacturers have progressed to more complicated designs due to an advance in technology as well as a highly competitive industrial environment. In particular, tire designers seek to use multiple rubber compounds in a tire component such as the tread in order to meet customer demands. Using multiple rubber compounds per tire component can result in a huge number of compounds needed to be on hand for the various tire lines of the manufacturer. For cost and efficiency reasons, tire manufacturers seek to limit the number of compounds available, due to the extensive costs associated with each compound. Each compound typically requires the use of a banbury mixer, which involves expensive capital expenditures. Furthermore, banbury mixers have difficulty mixing up tough or stiff rubber compounds. The compounds generated from the banbury mixers are typically shipped to the tire building plants, thus requiring additional costs for transportation. The shelf life of the compounds is not finite, and if not used within a certain time period, is scrapped.

Thus, it is desired to have an improved method and apparatus which provides independent flow of two or more compounds from a single application head. More particularly, it is desired to be able to make a custom tire tread directly onto a tire building machine in an efficient manner, reducing the need for multiple stations.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Tangent delta", or "tan delta," is a ratio of the shear loss modulus, also known as G", to the shear storage modulus (G'). These properties, namely the G', G" and tan delta, characterize the viscoelastic response of a rubber test sample to a tensile deformation at a fixed frequency and temperature, measured at 100° C.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 6A is a perspective cutaway view of a coextrusion nozzle of the present invention, while

DETAILED DESCRIPTION OF THE INVENTION

Figure 1A:
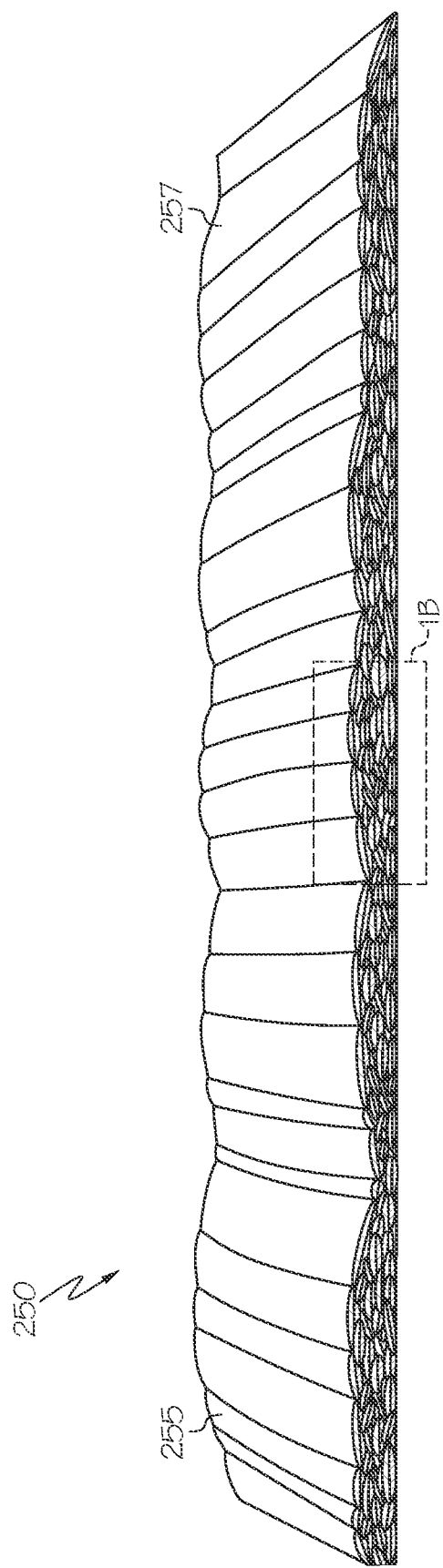
FIG. 1A is a cross-sectional view of a green (uncured) tread formed from two layers of strip lamination of a coextruded strip.
Figure 2A:
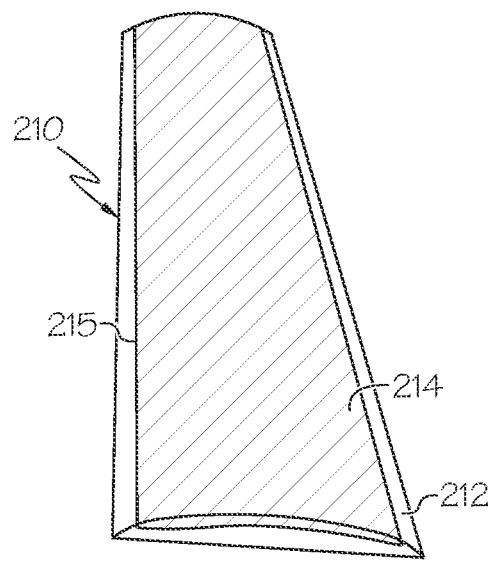
FIG. 2A is a perspective view of a coextruded strip of 90% of a first compound and 10% of a second compound of the present invention.
Figure 2B:
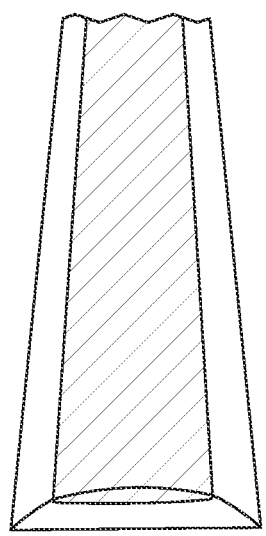
FIG. 2B is a perspective view of a coextruded strip of 95% of a first compound and 5% of a second compound.
Figure 3A:
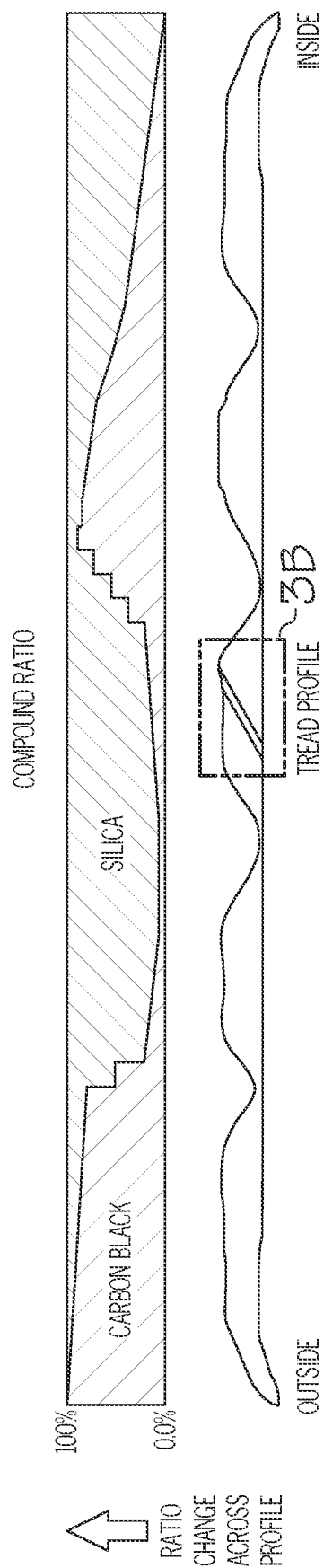
FIG. 3A is a cross-sectional view of a desired tire tread profile.
Figure 3B:
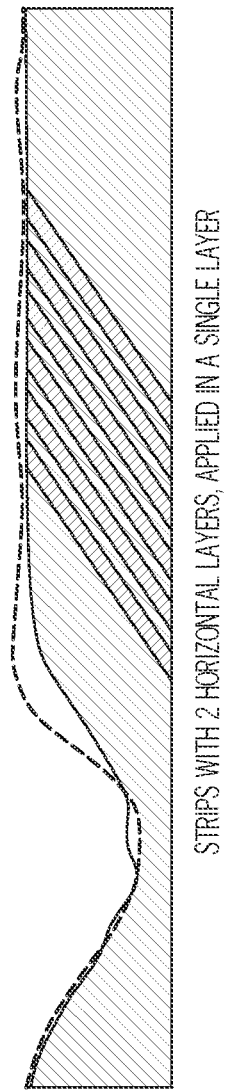
FIG. 3B is a close up view of the tire tread profile formed from coextruded strip.
Figure 4A:
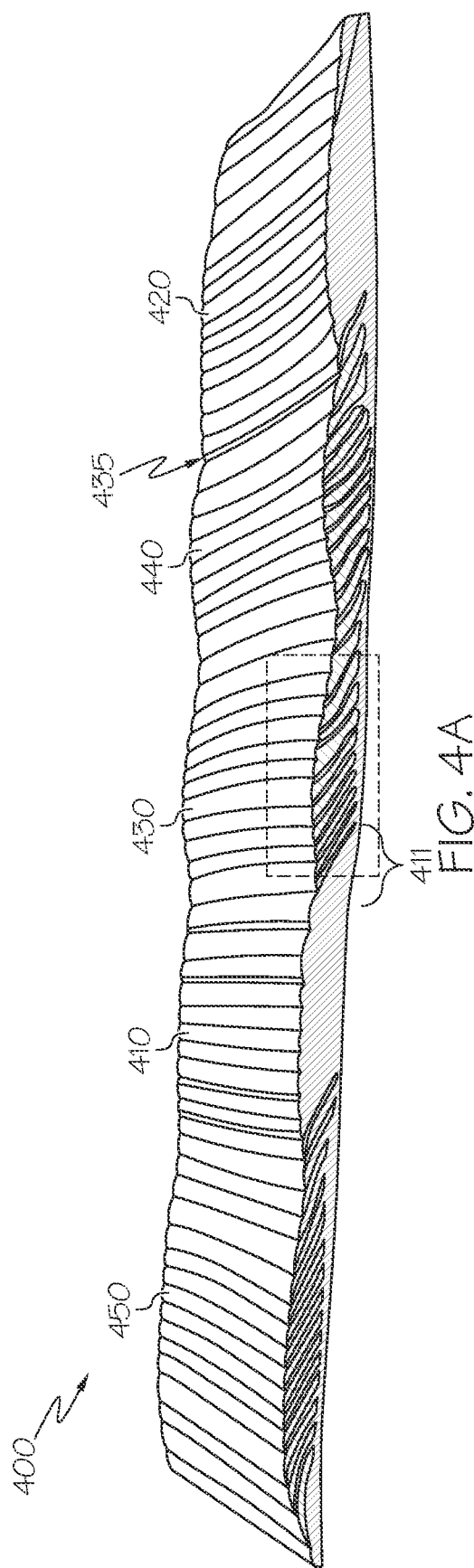
FIG. 4A is a cross-sectional view of a green (uncured) tread formed from a single layer of strip lamination of a coextruded strip.
Figure 4B:
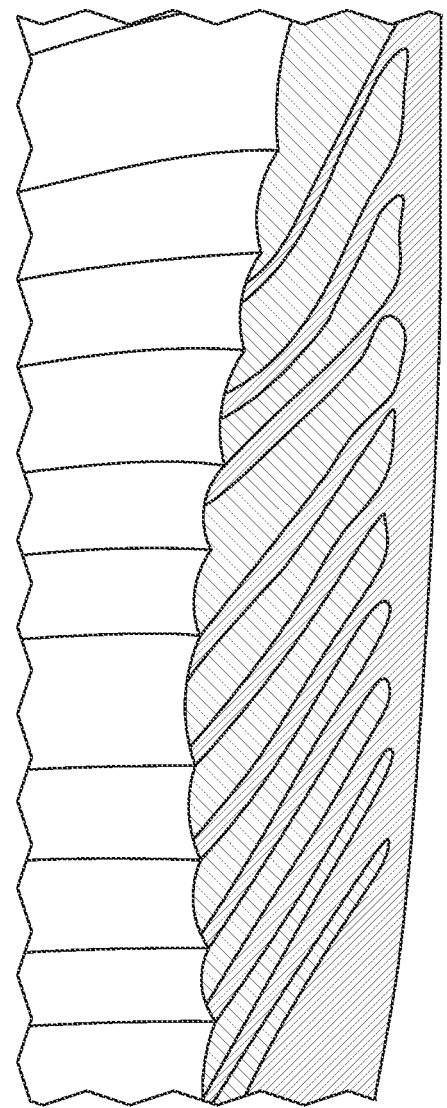
FIG. 4B is a close up view of the dotted area of FIG. 4A.
Figure 5:
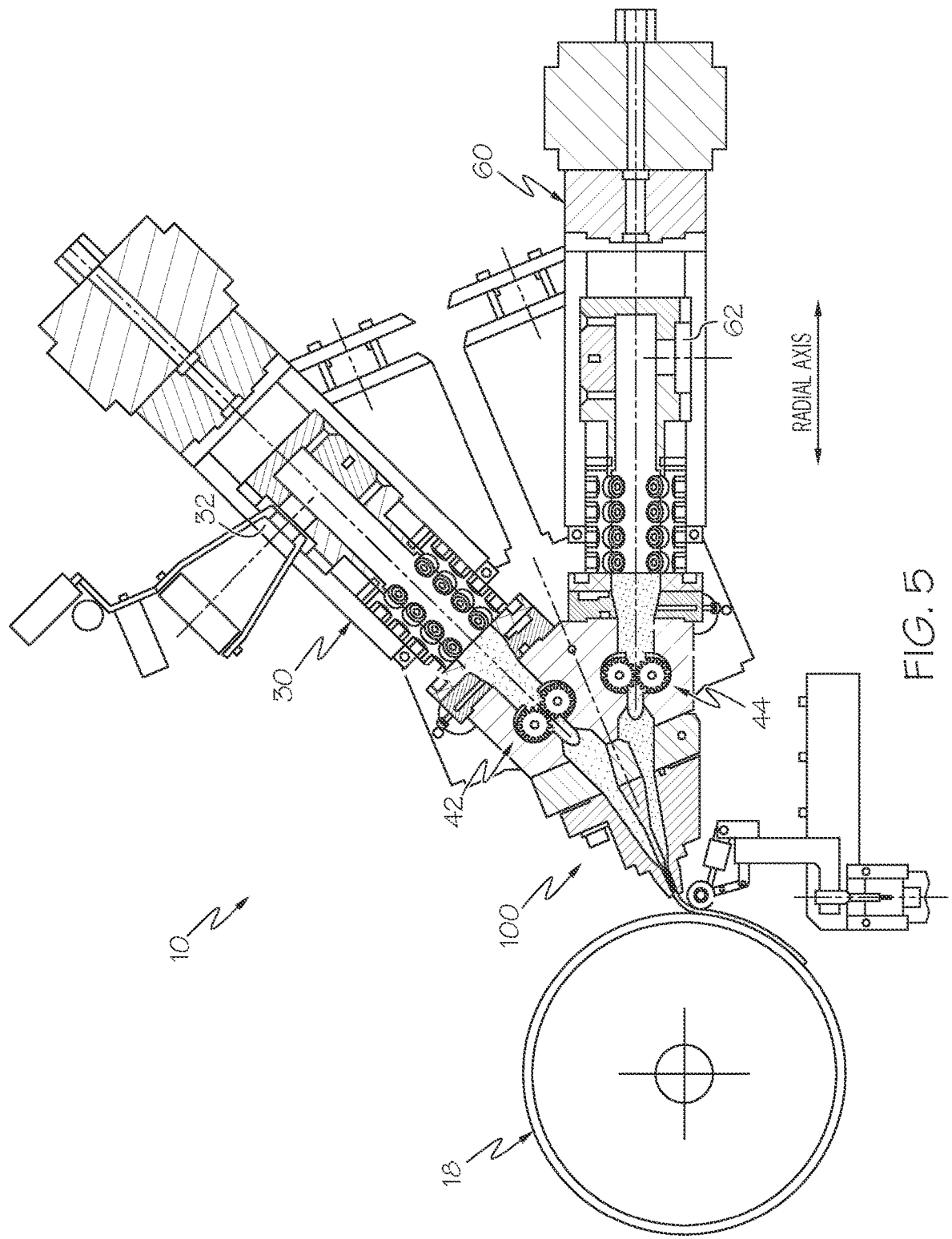
FIG. 5 is a close up cross-sectional view of a dual compound apparatus for forming a coextruded strip onto a tire building drum.

FIG. 1A illustrates a cross-sectional view of tire tread 250 of the present invention. The tire tread 250 is formed by strip lamination, or by winding a continuous coextruded strip 210 of a first and second layer of two different compounds, wherein the strip is applied directly onto a tire building drum 18 (as shown in FIG. 5) or a shaped green carcass. The continuous strip 210 is shown in FIG. 2A, and is a dual layer or coextruded strip of a first layer 212 and second layer 214 formed of two different rubber tread compounds. The first layer 212 is formed from a first rubber compound which can be any mono cap tread compound, typically full silica. The second compound is preferably a stiff rubber compound or any compound selected for desired properties different from the first compound.

Figure 6A:
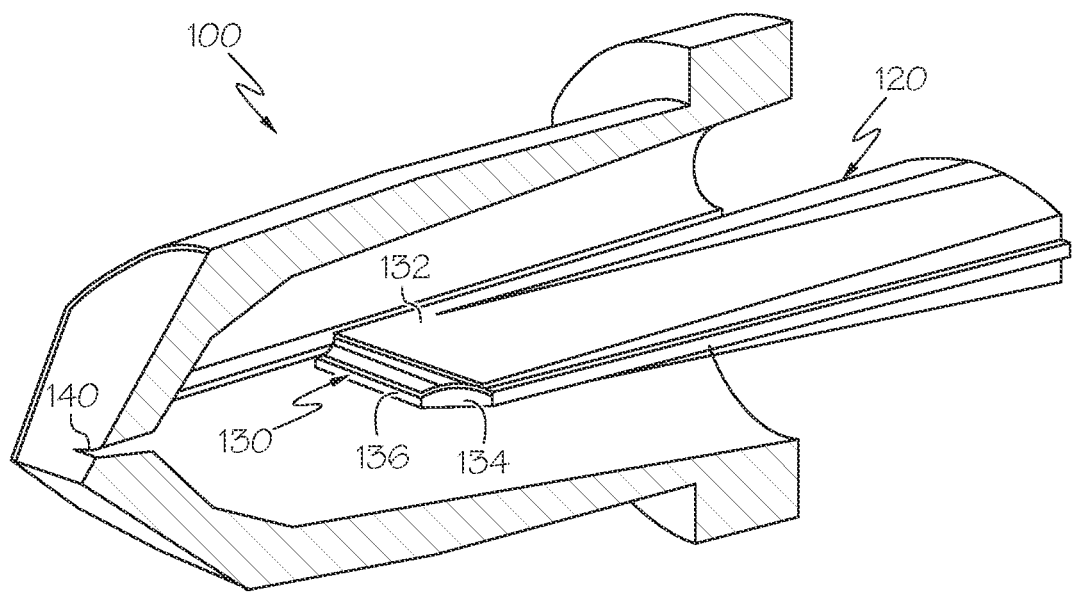
Figure 6B:
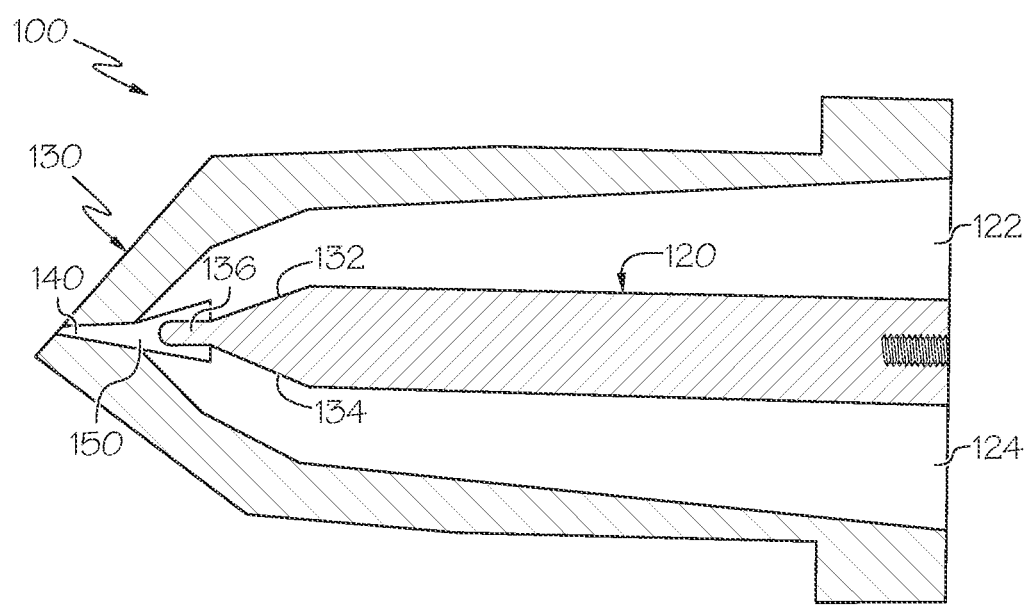
FIG. 6B is a side cross-sectional view of the coextrusion nozzle of FIG. 6A.

The apparatus used to form the continuous coextruded strip is described in the paragraphs below, and is shown in FIGS. 5-6. The apparatus can form the coextruded strip while instantaneously varying the ratio of the first compound to the second compound.

Figure 1B:
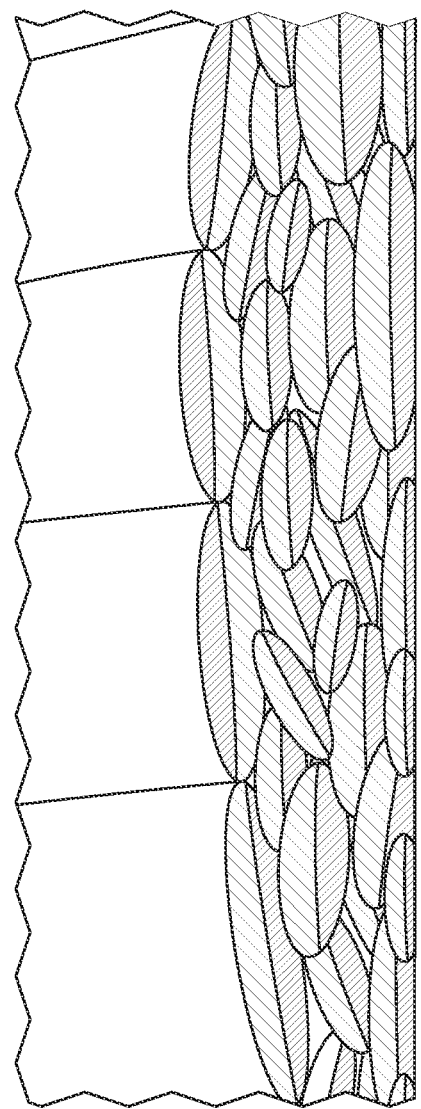
FIG. 1B is a close up view of area designated as 1B of FIG. 1A.

The coextruded strip forming apparatus 10 is used to form the tread shown in FIGS. 1A and 1B by rotating the drum 18 (or carcass) and then applying a continuous coextruded strip by spirally winding the strip onto the drum 18 or carcass. As shown, the strips are layered in the first row by overlapping the strips with each other. At the lateral ends, 255,257 the strip is preferably 100% of the first compound. Between the lateral ends 255,257 the coextruded strip composition is preferably in the range of 80-90% first compound, and 10-20% of a second compound. There are typically two rows of strips to form the tread. However, the coextruded strip composition may vary and be in the range of 10-100% of the first compound, and 90%-10 of the second compound. The coextruded strip composition may be changed almost instantaneously during application to the tire building drum due to the short residence time of the nozzle.

FIGS. 3A, 3B, and FIGS. 4A and 4B illustrates a second embodiment of a green tire tread 400 that is formed from a single layer of coextruded strips. The first compound (shown in red) is selected to be a high silica tread compound, while the second compound represented (shown in yellow), is selected to have a desired property, in this case stiffness, but could also be other properties such as wet grip. As shown, the coextruded strips have different tread compound ratios that vary axially across the tread profile. The outer lateral edge 420 is formed of a coextruded strip having a range of 90-100% of the first (shown in black) compound. The ribs or tread blocks 430 and 440 are formed in the range of 70-90% of the second (yellow) compound, and 10-30% of the first (black compound). The tread has a transition section 435 located between the outer lateral edge 420 and the rib 440. In the transition section 435, the second compound (yellow) gradually increases. Rib or tread block 410 is primarily 90-100% of the first tread compound, and has a transition section 411 that increases the first tread compound from the rib 430 to the rib 410. The other lateral edge 450 is formed of a coextruded strip of 50% first rubber compound to 50% second rubber compound. Thus, each tread block or rib area has a stiffness gradient that varies axially across the tread block or rib. The strips are angled and arranged in a single layer.

The second compound is preferably a high wear rubber compound, preferably a compound having a very high G' stiffness. The combination of the tread compound made with silica and the second compound of very high stiffness results in a tire tread with the desired wet performance and low rolling resistance, while providing desired stiffness in the designated areas of the tread.

The stiffness may be characterized by the dynamic modulus G', which are sometimes referred to as the "shear storage modulus" or "dynamic modulus," reference may be made to Science and Technology of Rubber, second edition, 1994, Academic Press, San Diego, Calif., edited by James E. Mark et al, pages 249-254. The shear storage modulus (G') values are indicative of rubber compound stiffness which can relate to tire performance. In a first embodiment, the second rubber compound comprises a stiff rubber composition having a shear storage modulus G' measured at 1% strain and 100° C. according to ASTM D5289 ranging from 15 to 50 MPa. In a more preferred embodiment, the second rubber compound comprises a rubber composition having a shear storage modulus G' measured at 1% strain and 100° C. according to ASTM D5289 ranging from 25 to 40 MPa. In the most preferred embodiment, the second rubber compound comprises a rubber composition having a shear storage modulus G' measured at 1% strain and 100° C. according to ASTM D5289 ranging from 30 to 40 MPa.

Coextruded Strip Forming Apparatus

As shown in FIGS. 7-8, the coextruded strip forming apparatus 10 includes a first extruder 30 and a second extruder 60, preferably arranged vertically in close proximity. The first extruder 30 has an inlet 32 for receiving a first rubber composition A, while the second extruder 60 has an inlet 62 for receiving a second rubber composition B. Each extruder functions to warm up the rubber composition to the temperature in the range of about 80° C. to about 150° C., preferably about 90° C. to about 120° C., and to masticate the rubber composition as needed. The coextruded strip forming apparatus 10 is mounted so that it can translate fore and aft in relation to a tire building drum 18.

Compound A is extruded by the first extruder 30 and then pumped by the first gear pump 42 into a nozzle 100, while at the same time Compound B is extruded by the second extruder 60 and then pumped by the second gear pump 44 into the coextrusion nozzle 100.

The coextrusion nozzle 100 has a removable insert 120 that functions to divide the nozzle into a first and second flow passageway 122,124. The removable insert 120 is preferably rectangular in cross-sectional shape. The removable insert 120 has a distal end 130 with tapered ends 132,134 forming a nose 136. The nose 136 is positioned adjacent the nozzle die exit 140 and spaced a few millimeters from the die exit 140. The region between the nose 136 and the die exit 140 is a low volume coextrusion zone 150 that is high pressure. In the low volume coextrusion zone 150, compound A flowstream 122 merges with compound B flowstream 124 forming two discrete layers 212,214 joined together at an interface 215.

The volume ratio of compound A to compound B may be changed by varying the ratio of the speed of gear pump of compound A to the speed of gear pump of compound B. The dual coextruded strip forming apparatus 10 can adjust the speed ratios on the fly, and due to the small residence time of the coextrusion nozzle, the apparatus has a fast response to a change in the compound ratios. This is due to the low volume of the coextrusion zone.

The methods and equipment used to form a coextruded strip of two different compounds can be used to create a composite tread structure with a ratio of reinforcement compound that may vary as desired. In one example, the desired property such as stiffness may be varied across a tread block or rib to create a stiffness gradient. The dual compound applier has the ability to put a stiffer compound in targeted or desired areas to provide extra stiffness where it is most effective without replacing large amounts of the main compound and comprising rolling resistance. This type of distribution would be impossible with a conventional extruder.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having a tread, wherein the tread is formed from a continuous spiral winding of a coextruded dual layer strip of a first and second compound joined together at an interface, wherein the first compound is made of silica, and the second compound is different than the first compound, wherein the tread has a first lateral edge formed from spirally winding a continuous strip of 90-99% of the first compound and 1-10% of the second compound, wherein the tread has a second lateral edge formed from spirally winding a continuous strip of 40-60% of the first compound and 60-40% of the second compound.

2. The tire tread of claim 1 wherein the tire tread has a rib formed of 90-100% of the first compound, and a second rib formed of a gradient of the first compound to the second compound.

3. The tire tread of claim 2 wherein the second compound comprises a rubber composition having a shear storage modulus G' measured at 1% strain and 100° C. according to ASTM D5289 ranging from 23 to 50 MPa.

4. The tire tread of claim 2 wherein the second compound comprises a rubber composition having a shear storage modulus G' measured at 1% strain and 100° C. according to ASTM D5289 ranging from 40 to 60 MPa.

5. The tire of claim 2 wherein the second layer of compound has a thinner gauge than the first layer of compound.

6. The tire of claim 2 wherein the continuous coextruded strip has a rectangular cross-sectional shape.

7. The tire of claim 2 wherein the continuous coextruded strip has a trapezoidal cross-sectional shape.

\* \* \* \* \*